United States Patent [19]

Eto et al.

[11] Patent Number: 4,793,431

[45] Date of Patent: Dec. 27, 1988

[54] APPARATUS FOR CONTROLLING STEERING FORCE PRODUCED BY POWER-STEERING SYSTEM

[75] Inventors: Kunihiko Eto, Toyota; Yutaka Mori; Kazumasa Kodama, both of Okazaki, all of Japan

[73] Assignee: Toyoda Koki Kabushiki Kaisha, Kariya, Japan

[21] Appl. No.: 92,584

[22] Filed: Sep. 3, 1987

[30] Foreign Application Priority Data

Sep. 12, 1986 [JP] Japan ................................ 61-216795

[51] Int. Cl.[4] .............................................. B62D 5/06
[52] U.S. Cl. ................................ 180/142; 364/424.05
[58] Field of Search ............... 180/141, 142, 143, 79.1; 364/424; 361/139, 152, 154, 160, 170

[56] References Cited

U.S. PATENT DOCUMENTS

| 4,476,529 | 10/1984 | Nakamura | 180/142 |
|---|---|---|---|
| 4,506,909 | 3/1985 | Nakashima et al. | 280/707 |
| 4,574,905 | 3/1986 | Asano | 180/142 |
| 4,593,358 | 6/1986 | Takeshima et al. | 364/424 |
| 4,602,695 | 7/1986 | Takeshima et al. | 180/143 |
| 4,626,994 | 12/1986 | Yabe et al. | 364/424 |
| 4,651,290 | 3/1987 | Masaki et al. | 364/550 |
| 4,662,466 | 5/1987 | Eto | 180/142 |
| 4,676,334 | 6/1987 | Nakamura | 180/142 |
| 4,690,233 | 9/1987 | Daido | 180/142 |
| 4,705,130 | 11/1987 | Fukunaga et al. | 180/140 |

FOREIGN PATENT DOCUMENTS

| 60-18455 | 1/1985 | Japan . | |
|---|---|---|---|
| 240568 | 11/1985 | Japan | 180/142 |
| 255576 | 12/1985 | Japan | 180/142 |
| 67664 | 4/1986 | Japan | 180/142 |

*Primary Examiner*—David M. Mitchell
*Assistant Examiner*—Everett G. Diederiks, Jr.
*Attorney, Agent, or Firm*—Oblon, Fisher, Spivak, McClelland & Maier

[57] ABSTRACT

There is disclosed an apparatus for controlling the ratio of the assisting force produced by a power-steering system installed in an automobile to the steering torque supplied by the driver. The apparatus primarily consists of a microprocessor, a ROM, and a RAM. The microprocessor controls the amount of current supplied to a solenoid valve according to the velocity of the automobile. The aforementioned ratio is varied according to the driver's condition and the road condition. Four graphs representing the relation of the electric current supplied to the solenoid valve to the angle through which the steering wheel is rotated are stored in the ROM. Each graph has two characteristic curves for two different values of the velosity of the automobile. The microprocessor calculates a driver's condition index from the output signal from a velocity sensor. Also, it calculates a road condition index from the output signal from a steering angle sensor. The value of the current supplied to the solenoid valve is selected from the data stored in the ROM according to these indices.

7 Claims, 12 Drawing Sheets

APPARATUS FOR CONTROLLING STEERING FORCE PRODUCED BY POWER-STEERING SYSTEM

BACKGROUND OF THE INVENTION

1. Field of the Invention

The present invention relates to an apparatus which has an electronic control device to control the assisting force produced by a power-steering system, according to the conditions of a traveling automobile, for varying the ratio of the assisting force to the steering force supplied by the driver.

2. Description of the Prior Art

Usually, a power-steering system of this kind utilizes the velocity of the automobile to detect the conditions of the moving automobile. The assisting force is controlled according to the result of the detection in such a way that the assisting force is increased or decreased, depending on whether the velocity lies in a low-speed range or a high-speed range, respectively. In a known power-steering system as disclosed in Japanese Patent Laid-Open No. 59,574/1984, one characteristic curve is selected from several previously determined characteristic curves according to the road condition, i.e., whether the automobile goes down streets or mountain roads. Each of the characteristic curves determines the relation between the vehicle speed and the rotational frequency of the oil pump. This known system can vary the ratio of the assisting force to the steering effort supplied by the driver, depending on the vehicle speed and also on the road conditions. This ratio will be hereinafter referred to as the "power assistance ratio."

However, the running conditions of the automobile varies not only depending on the aforementioned vehicle speed and road conditions but also depending on the driver's conditions, i.e., the temper and character of the driver. That is, the condition of the automobile changes, according to whether the driver drives boldly or moderately. Therefore, it has not been necessarily possible for the prior art techniques to provide appropriate power assistance ratio according to the driver's conditions.

In order to solve this problem, the present inventors and others proposed a new technique in U.S. patent application Ser. No. 946,050 in 1986. According to this proposed technique, a first driving condition index $K_\theta$ corresponding to the road conditions and a second driving condition index $K_v$ corresponding to the driver's conditions are calculated. Then, the following arithmetic operation is performed.

$$I = I_\theta + I_v$$

where $I_\theta$ is an electric current applied according to the first index $K_\theta$, and $I_v$ is an electric current applied according to the second index $K_v$. The sum control current I is applied to a solenoid valve which varies the power assistance ratio. The value of the second term $I_v$ of the formula varies only according to the second condition index $K_v$. Therefore, the characteristic curve of the control current I is obtained simply by shifting the characteristic curve of the applied current $I_\theta$ upwardly or downwardly according to the second index $K_v$. For this reason, the control current I cannot vary sufficiently freely. Hence, the power assistance ratio changes merely within a limited range.

SUMMARY OF THE INVENTION

Accordingly, it is a main object of the present invention to provide an apparatus which controls a power-steering system in such a way that it permits the power-steering system to produce an appropriate assisting force, not only depending on the road conditions but also on the driver's conditions, and that it extends the range in which the power assistance ratio of the power-steering system can be varied.

It is another object of the invention to provide an apparatus which controls a power-steering system, takes one control current value from each of at least four different graphs according to the velocity of the automobile, and then selects one control current value to be applied to a solenoid valve for controlling the power assistance ratio from the four selected values, depending on the road condition and also on the driver's condition.

In summary, the inventive apparatus for controlling the steering force produced by a power-steering system calculates a driver's condition index indicative of the driver's condition from the latest plural kinds of information furnished from a velocity sensor, the information indicating the velocity of the automobile. Also, the apparatus calculates a road condition index indicative of the road condition from the latest plural kinds of information delivered from an angle sensor that senses the angle through which the steering wheel of the automobile is rotated. Graphs containing characteristic curves corresponding to at least four conditions, including the combinations of first and second driver's conditions and first and second road conditions, are prepared. At least four control current values are taken from the graphs according to the information regarding the velocity of the automobile. One is selected from these at least four control current values according to the driver's condition index and the road condition index. An electric current having this selected value is supplied to the solenoid valve for controlling the power assistance ratio. Preferably, the first driver's condition is the state in which the driver drives quite moderately; the second driver's condition is the state in which the driver drives quite boldly; the first road condition is the state in which the automobile goes down streets having many straight roads and many right-angled corners; ad the second road condition is the state in which the automobile goes down mountain roads or winding roads.

In this structure, the velocity of the automobile can assume values corresponding to the at least four conditions, including the two driver's conditions and the two road conditions. Those control current values which correspond to these values of the velocity are taken from their respective graphs. Then, one is selected from these control current values according to the driver's condition and the road condition. Consequently, the assisting force which is suited for any other driver's condition between the two driver's conditions and also for any other road condition between the two road conditions can be taken from the four graphs without requiring any graph containing intermediate characteristic curves which would otherwise be used for such intermdiate conditions.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENTS

Figure 1:
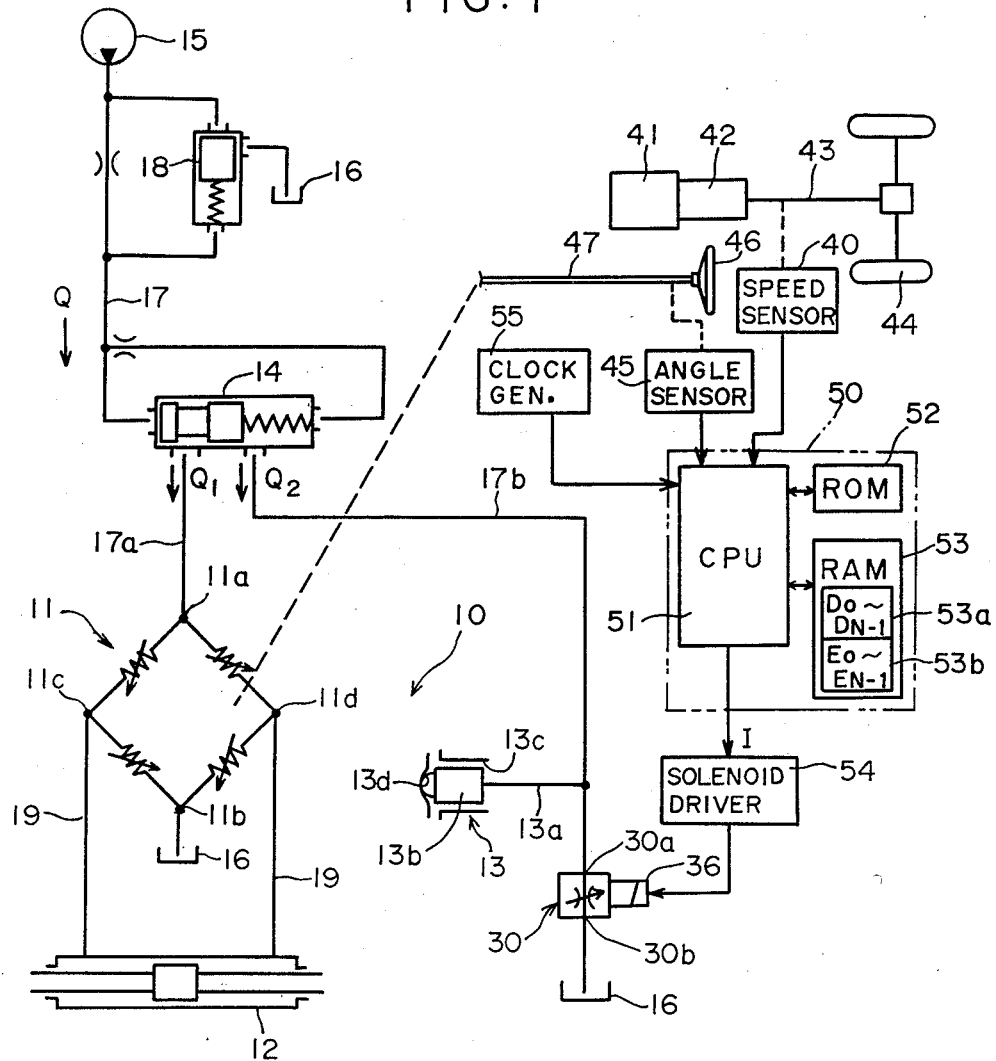
FIG. 1 is a schematic block diagram of an apparatus for controlling a power-steering system, the apparatus being fabricated in accordance with the invention.
Figure 2:
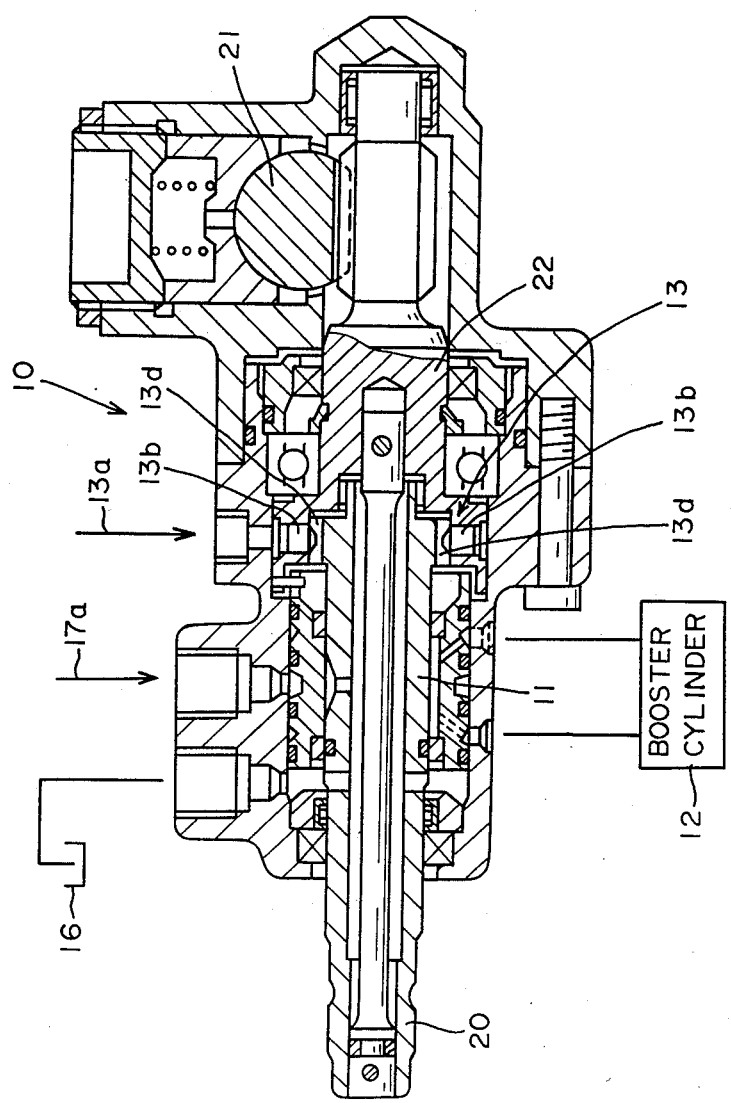
FIG. 2 is a horizontal cross section of the power-steering system shown in FIG. 1.

Referring to FIGS. 1 and 2, a rack-and-pinion power steering system is generally indicated by reference numeral 10. This power-steering system 10 comprises a servo valve 11, a booster cylinder 12, and a reaction mechanism 13 incorporated in the valve 11. This servo valve 11 is connected to the steering wheel 46 of an automobile via a steering column 47. The cylinder 12 has a piston rod 21 which is connected to the front wheels of the automobile via a link mechanism (not shown).

A pump 15, such as a vane pump, is driven by the engine 41 of the automobile, and incorporates a bypass valve 18 to supply working fluid at a constant flow rate Q into a flow-dividing valve 14 through a discharge passage 17. The working fluid is distributed between a servo valve passage 17a and another servo valve passage 17b at constant flow rates $Q_1$ and $Q_2$, respectively. The passage 17a is connected to the booster cylinder 12 via the servo valve 11. The reaction mechanism 13 and a solenoid valve 30 are connected to the passage 17b.

The servo valve 11 is of the known rotary type and mounted between the booster cylinder 12 and the pump 15. When the steering wheel 46 is rotated by the driver, the steering effort is transmitted via the steering column 47 to the input shaft 20 of the servo valve 11 to actuate the valve 11. Then, the valve 11 controls the flow of the working fluid into and out of both chambers of the cylinder 12 to produce an assisting force. The steering force augmented in this way is transmitted to the front wheels via the piston rod 21 of the cylinder 12. The used working fluid is returned to a reservorir 16 and drawn again into the pump 15.

The reaction mechanism 13 mainly consists of plungers 13b and V-shaped inclined surfaces 13d. The output shaft 22 of the servo valve 11 has a pair of radially extending holes 13c in which the plungers 13b are fitted, respectively. The diametrically oppositely inclined surfaces 13d are formed on the input shaft 20 of the valve 11, and come into contact with the front ends of the plungers 13b. Working fluid is introduced into the rear portions of the plungers 13b of a port 13a formed in the reaction mechanism 13. The pressure of this fluid is varied by the solenoid valve 30 to twist a torsion spring (not shown) to a larger or lesser extent. As a result, the characteristic of tee operation of the servo valve 11 with respect to the manual steering torque is varied.

The structure and the operation of the servo valve 11, the booster cylinder 12, and the reaction mechanism 13 are described in detail in U.S. patent application Ser. No. 865,337, filed 1986, assigned to the assignee of the present application. Accordingly, this patent application is herein incorporated by reference for a fuller understanding of the present invention. The solenoid valve 30 is similar in structure to tee solenoid valve disclosed in the aforementioned U.S. patent application Ser. No. 865,337 (1986). As the electric current applied to the solenoid 36 of the valve 30 is increased, the valve narrows the opening of a variable restrictor to increase the pressure of fluid acting on the plungers 13b. The valve 30 is provided with a narrow fixed restrictor to allow fluid to pass through the valve at a given flow rate when the variable restrictor is fully closed.

Figure 3A:
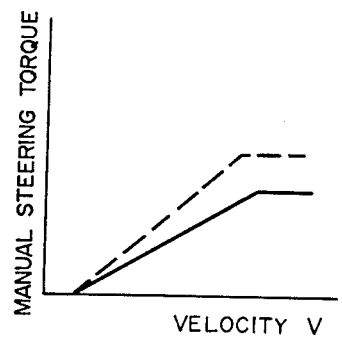
FIG. 3(A) is a graph in which manual steering torque is plotted against vehicle speed.
Figure 3B:
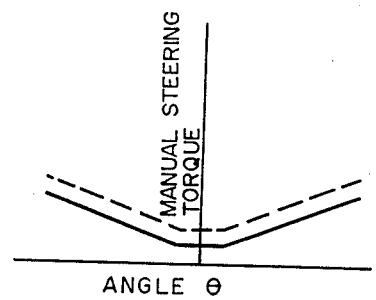
FIG. 3(B) is a graph in which manual steering torque is plotted against the angle through which the steering wheel is rotated.

In the power-steering system constructed as described above, if the opening of the variable restrictor of the solenoid valve 30 is varied only according to the speed of the automobile, then the driver is required to supply a larger steering torque as the automobile speed increases, as indicated by the solid line in FIG. 3(A). Also, as the steering wheel is rotated further, the steering torque is required to be increased, as indicated by the solid line in FIG. 3(B). However, with this operation, the power assistance ratio, i.e., the ratio of the assisting torque to the manual steering torque, remains constant irrespective of whether the driver drives boldly or modelately or whether the road undulates or not. In the present example, the opening of the solenoid valve 30 is varied, depending not only on the vehicle speed but also on driver's condition index and road condition index (described later), by the use of an electronic control apparatus 50 shown in FIG. 1. Thus, the power assistance ratio is changed according to the driver's condition and the road condition.

Referring again to FIG. 1, the electronic control apparatus 50 mainly consists of a microprocessor (CPU) 51, a read-only memory (ROM) 52, and a random access memory (RAM) 53. The CPU 51 is connected to the solenoid 36 of the solenoid valve 30 via a solenoid energization circuit 54 to control the electric current applied to the solenoid 36. Also, the CPU 51 is connected to a vehicle speed sensor 40 via an interface (not shown). The sensor 40 comprises a tachometer connected to the output shaft 43 of the transmission, indicated by numeral 42, of the automobile. The driving force of the engine, indicated by numeral 41, is transmitted to the rear wheels 44 via the transmission 42. The vehicle speed v is determined from the frequency of pulses produced by the sensor 40. The CPU 51 is also connected to a steering angle sensor 45 via an interface (not shown). As an example, the angle sensor 45 comprises a rotating plate fixed to a steering column 47, two optical interrupters, and a phase discrimination circuit. The angle sensor 45 detects the angle $\theta$ through which the steering wheel 46 is rotated.

Figure 5A:
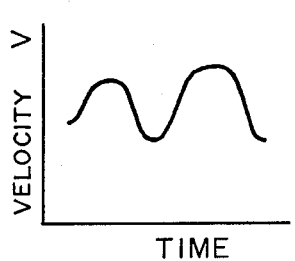
FIGS. 5(A) and 5(B) are graphs showing vehicle velocity characteristics with respect to time for two different driver's conditions.
Figure 5B:
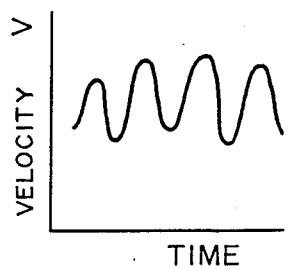
Figure 5C:
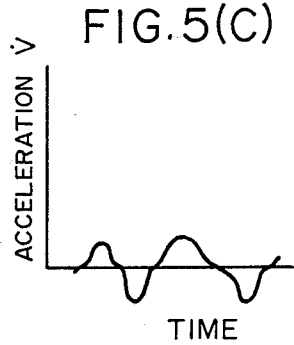
FIGS. 5(C) and 5(D) are graphs showing vehicle acceleration characteristics with respect to time for two different driver's conditions.
Figure 5D:
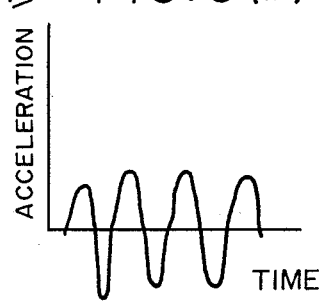
Figure 5E:
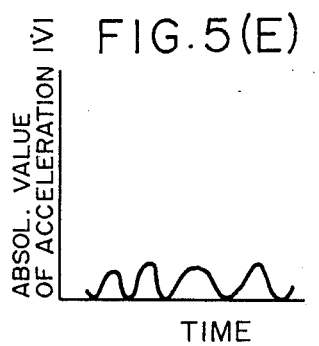
FIGS. 5(E) and 5(F) are graphs showing vehicle acceleration absolute value characteristics with respect to time for two different driver's conditions.
Figure 5F:
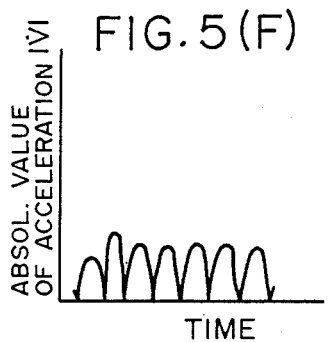

When the driver drives moderately, the vehicle speed varies relatively infrequently, as shown in FIG. 5(A). When the driver drives boldly, the speed varies frequently, as shown in FIG. 5(B). When the driver drives moderately, the acceleration ($\dot{v}$) curve has a small number of peaks and varies moderately, as shown in FIG. 5(C). When the driver drives boldly, the acceleration curve has more peaks and changes violently, as shown in FIG. 5(D). When the driver drives moderately, the curve of the absolute value of the acceleration, given by $|\dot{v}|$, has a small number of low peaks, as shown in FIG. 5(E). When the driver drives boldly, the curve of the absolute value has many high peaks, as shown in FIG. 5(E). The absolute value of the acceleration is integrated for a certain period of time, and the obtained value is used as a driver's condition index $J_1$. This index assumes small values when the driver drives moderately and takes up large values when the driver drives boldly. Thus, it is possible to know whether the driver drives boldly or moderately.

Figure 6A:
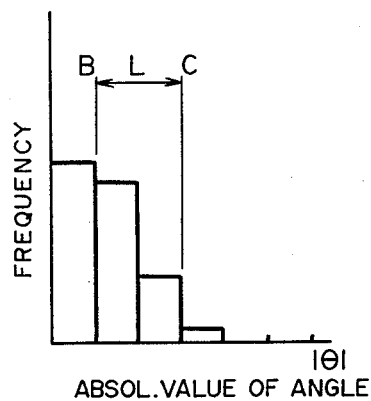
FIGS. 6(A) and 6(B) are histograms showing frequency distributions of absolute values of the angle through which the steering wheel is rotated, for two road conditions.
Figure 6B:
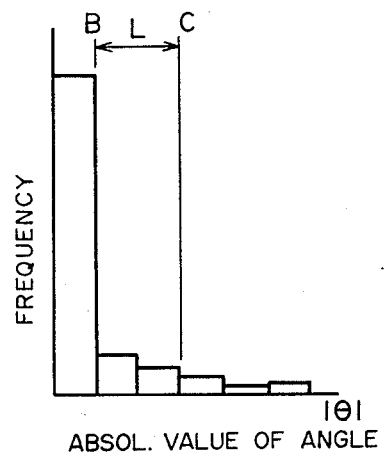

Streets have small number of curves but have many intersections. Therefore, when the automobile goes down streets, it often changes its direction by 90°. Hence, in this situation, the frequencies of moderate values of the angle $\theta$ through which the steering wheel is rotated are relatively low, as shown in FIG. 6(B). When the automobile goes down a mountain road, it turns many curves but its direction is rarely rotated through 90°. Therefore, the frequencies of moderate values are relatively large, as shown in FIG. 6(A). The frequency distribution of the absolute value ($|\theta|$) of the angle $\theta$ within a certain period of time is taken. The frequency of a moderate value of the angle $\theta$ corresponding to a movement of the automobile along a curve is found. This frequency is divided by the total frequency. The resulting quotient is used as a road condition index $J_2$. The value of this index $J_2$ is small when the automobile goes along streets, as shown in FIG. 6(B) and large when it goes down a mountain road, as shown in FIG. 6(A). In this way, it is possible to know whether the automobile goes down streets or mountain roads.

A control signal is applied to the solenoid 36 of the solenoid valve 30 to control the relation between the angle $\theta$ through which the steering wheel is rotated and the vehicle speed v. Four graphs containing characteristic curves of this control current are stored in the ROM 52. These graphs are $A_1$, $A_2$, $A_3$, $A_4$ shown in FIGS. 4(A)-4(D). The graph $A_1$ indicates characteristics of a first control current $i_1$ applied to the solenoid 36 according to the varying angle $\theta$ and speed v when the driver's condition index $J_1$ is equal to 0, i.e., the driver drives quite moderately, and when the road condition index $J_2$ is equal to 0, i.e., the automobile goes down streets and turns quite few curves. The first control current $i_1$ increases at a given rate with increasing the angle $\theta$ and the speed v within certain ranges, i.e., $\theta_1 < \theta < \theta_2$ and $v_1 < v < v_2$, but it is held constant outside these ranges. The graph $A_4$ indicates characteristics of a fourth control current $i_4$ applied to the solenoid 36 according to the varying angle $\theta$ and speed v when the driver's condition index $J_1$ is equal to 1, i.e., the driver drives quite boldly, and when the road condition index $J_2$ is equal to 1, i.e., the automobile goes along a mountain road having a very large number of curves. The value of the current $i_4$ varies similarly to the current $i_1$ with increasing the angle $\theta$ and the speed v, but it generally assumes values considerably larger than the values of the current $i_1$. The graph $A_2$ indicates characteristics of a second control current $i_2$ applied when $J_1=1$ and $J_2=0$. The graph $A_3$ indicates characteristics of a third control current $i_3$ applied when $J_1=0$ and $J_2=1$. The values of the currents $i_2$ and $i_3$ vary similarly to the currents $i_1$ and $i_4$ with increasing the angle $\theta$ and the speed v. The currents $i_2$ and $i_3$ are set to values between the values of the currents $i_1$ and $i_4$.

Figure 8:
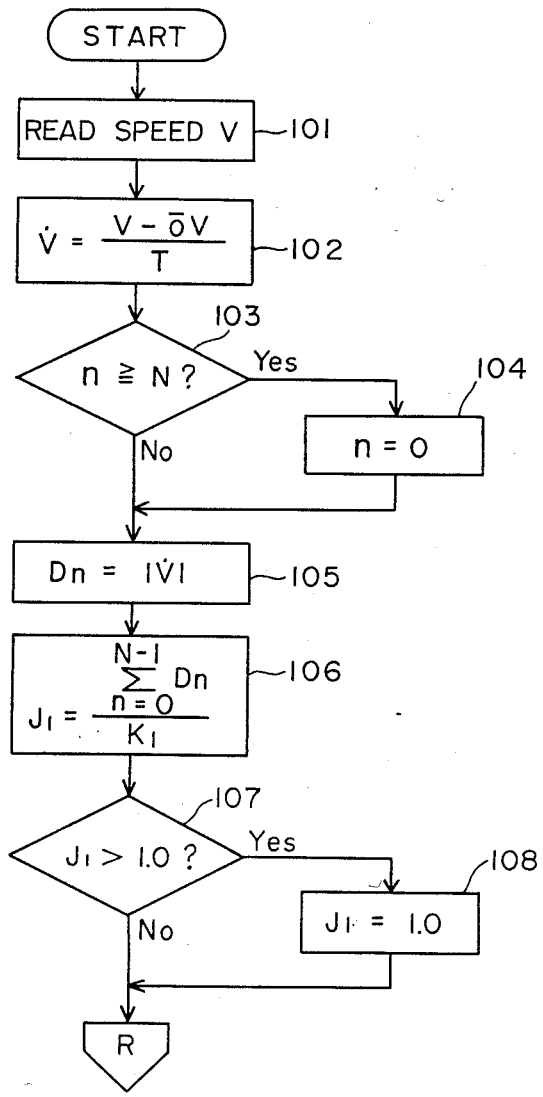
FIG. 8 is a flowchart for specifically illustrating step I of the flowchart shown in FIG. 7.

To calculate the driver's condition index $J_1$, the RAM 53 is equipped with a number of buffer registers $D_0$-$D_{N-1}$. The CPU 51 calculates the absolute value $|\dot{v}|$ of the acceleration $\dot{v}$ at regular intervals of T according to the formula $$\dot{v}=(v-ov)/T \tag{1}$$

where $ov$ is the vehicle velocity stored in the registers $D_0$-$D_{N-1}$ last time. The absolute values calculated successively in this way are held in the registers $D_0$-$D_{N-1}$. Each time an absolute value is stored in the last register $D_{N-1}$, the CPU 51 then stores the next absolute value in the first register $D_0$ and updates the contents of the register. The CPU 51 calculates the integral $J_1$ of the values held in the registers $D_0$-$D_{N-1}$ according to the formula $$J_1 = \sum_{n=0}^{N-1} D_n/K_1 \tag{2}$$

where $K_1$ is a constant. Where the driver drives quite boldly, the relation $J_1 \simeq 1$ is determined experimentally. The calculated value $J_1$ is defined as the driver's condition index. These arithmetic operations are performed in accordance with a program as illustrated by the flowchart of FIG. 8. This program is stored in the ROM 52.

Figure 9:
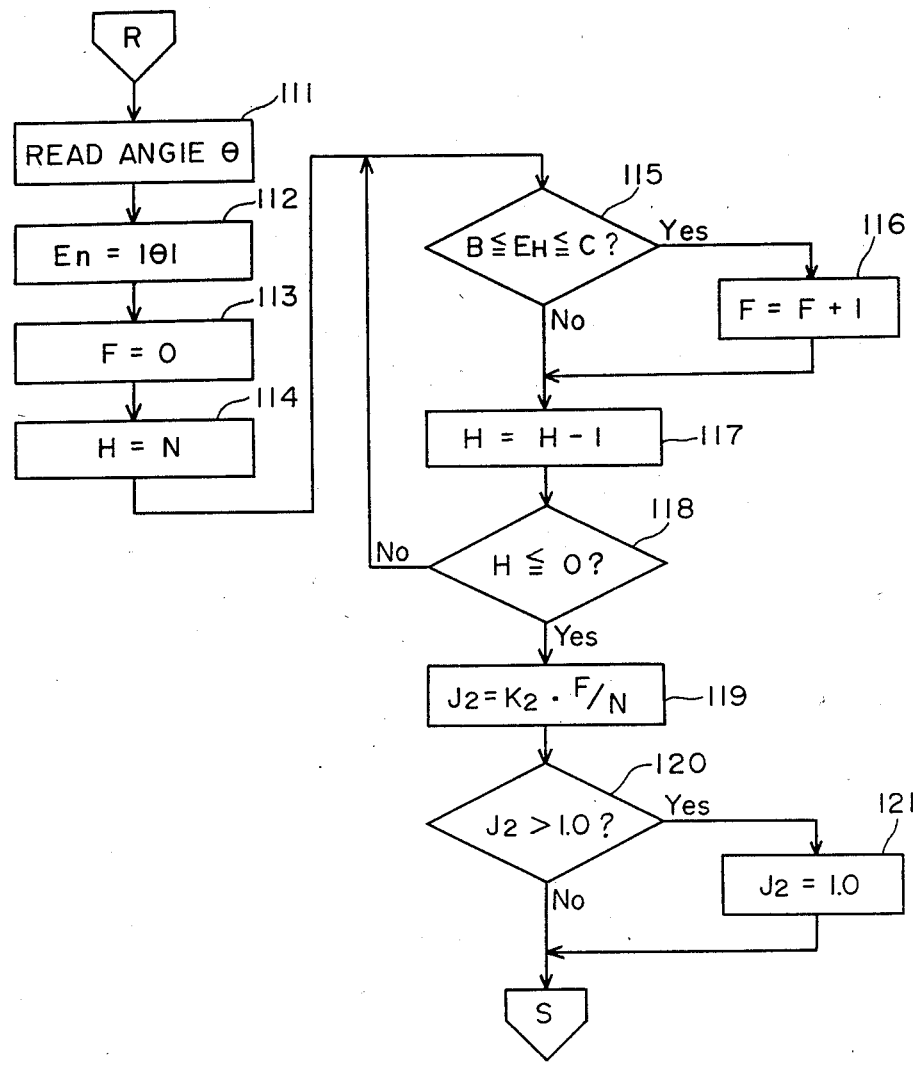
FIG. 9 is a flowchart for specifically illustrating step II of the flowchart shown in FIG. 7.

The RAM 53 is also equipped with a number of other buffer registers $E_0$-$E_{N-1}$ to calculate the road condition index $J_2$. The CPU 51 successively stores values of the angle $\theta$ in the registers $E_0$-$E_{N-1}$ at regular intervals of T. Whenever the contents of the last register $E_{N-1}$ are updated, the CPU stores the next value in the first register $E_0$. Thus, the contents of the registers are successively updated. The CPU 51 calculates the frequencies F from the contents of the registers $E_0$-$E_{N-1}$ except for small and large values of the angle $\theta$, i.e., except where the steering wheel is rotated through small or large angles. The road condition index $J_2$ is calculated according to the formula $$J_2 = K_2 \times F/N \tag{3}$$

where $K_2$ is a constant. When the automobile goes down mountain roads having many curves, the relation $J_2 \simeq 1$ is experimentally determined. These arithmetic operations are performed according to a program as illustrated by the flowchart of FIG. 9. This program is stored in the ROM 52.

Figure 4A:
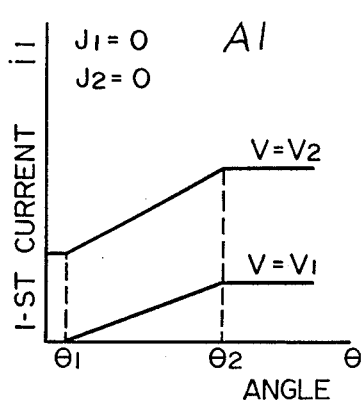
FIGS. 4(A)-4(D) are graphs in each of which the value of a control current is plotted against the angle through which the steering wheel is rotated, for two different vehicle velocities, each graph corresponding to a different condition.
Figure 4B:
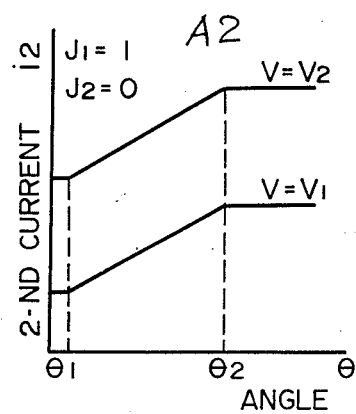
Figure 4C:
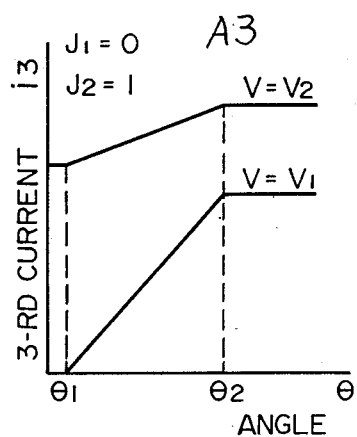
Figure 4D:
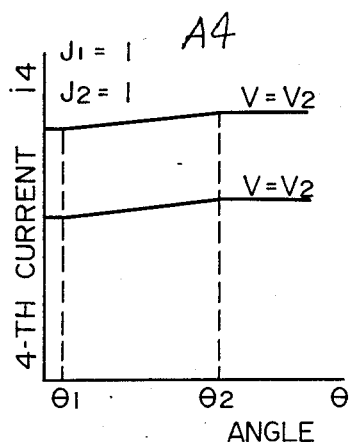

The CPU 51 takes a first intermediate current value $I_1$ to be applied to the solenoid 36 of the solenoid valve 30 either from the first graph $A_1$ (FIG. 4(A)) or from the second graph $A_2$ (FIG. 4(B)) according to the present vehicle speed v the angle $\theta$ through which the steering wheel is rotated, and the driver's condition index $J_1$ when the automobile goes down streets. The CPU 51 takes a second intermediate current value $I_2$ to be applied to the solenoid valve 30 either from the third graph $A_3$ (FIG. 4(C)) or from the fourth graph $A_4$ (FIG. 4(D)) when the vehicle goes down a mountain road. Then, the CPU 51 calculates the output control current value I to be applied to the solenoid 66 according to the road condition index $J_2$, the first intermediate current value $I_1$, and the second intermediate current value $I_2$, employing the formula $$I = (I_2 - I_1) \times J_2 + I_1 \qquad (4)$$

Figure 10:
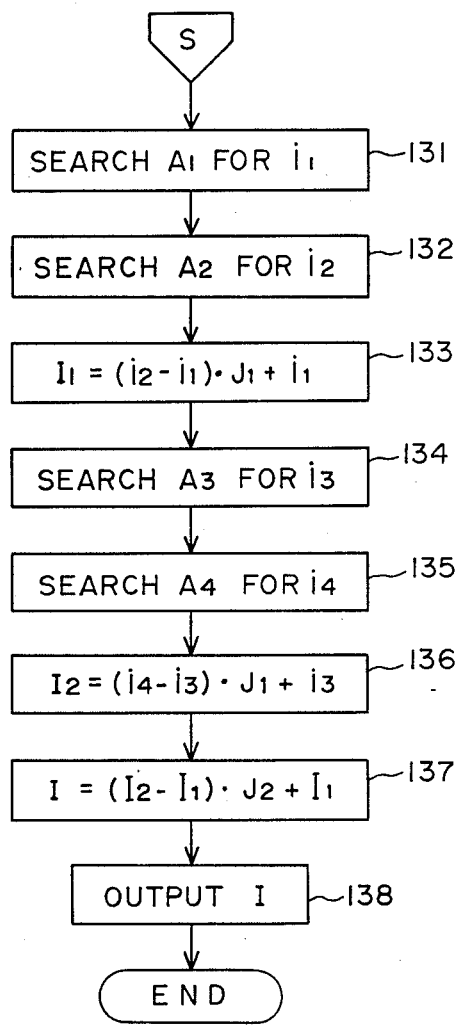
FIG. 10 is a flowchart for specifically illustrating step II of the flowchart shown in FIG. 7.

The output current having this value I is supplied to the solenoid 36 of the solenoid valve 30. These arithmetic operations are carried out in accordance with a program as illustrated by the flowchart of FIG. 10. This program is stored in the ROM 52.

As the values of the indices $J_1$ and $J_2$ increase, the value I of the output current applied to the solenoid 36 increases, reducing the opening of the solenoid valve 30. This increases the pressure introduced into the reaction mechanism 13. Then, as indicated by the broken lines in FIGS. 3(A) and 3(B), the steering torque to be supplied by the driver increases with increasing the vehicle velocity v and the angle $\theta$. The value of the first term of the left side of formula (4) above varies according to the road condition index $J_2$ and also according to the driver's condition index $J_1$. Therefore, the characteristic curve of the control current I not only makes a parallel movement relative to the first intermediate current $I_1$ but also generally or partially tilts. In this way, the control current I varies with a large degree of freedom. As a result, the characteristic curve also changes with a large degree of freedom.

Figure 7:
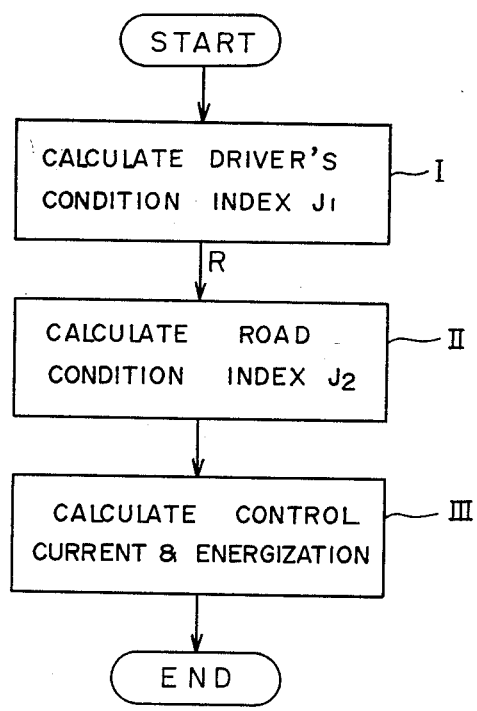
FIG. 7 is a flowchart for schematically illustrating the system program run by the microprocessor shown in FIG. 1.

The apparatus constructed as described above operates in the manner described below. As shown in FIG. 7, the CPU 51 successively performs an arithmetic operation I for calculating the driver's condition index $J_1$, an arithmetic operation II for calculating the road condition index $J_2$, and an arithmetic operation III for calculating the output current value I.

When the main switch (not shown) of the automobile is closed, the electronic control apparatus 50 sets various variables to 0 or other initial values. As the automobile moves, the vehicle speed v and the angle $\theta$ through which the steering wheel is rotated varies at every moment. The velocity v and the angle $\theta$ are detected by the speed sensor 40 and the angle sensor 45, respectively. Their present values are held in registers (not shown). A clock generator circuit 55 produces an interrupt signal at regular intervals of time, say 0.5 second, to the CPU 51. The CPU 51 carries out the arithmetic operations according to the programs in synchronism with the interrupt signal.

(I) Arithmetic Operation for Calculating the Driver's Condition Index $J_1$

Referring to FIG. 8, the CPU 51 first fetches the vehicle speed v from the register holding the present value (step 101). The speed v is differentiated to obtain the acceleration $\dot{v}$ according to the above-described formula (1)(step 102). Then, the CPU 51 compares the number n of the sampled values with the number of N of the buffer registers $D_0$–$D_{N-1}$ (step 103). If the relation $n \geq N$ does not hold, control directly proceeds to step 105. If the relation $n \geq N$ holds, control goes to step 104, where the number n is reset to 0. Then, control proceeds to step 105, where the absolute value $|\dot{v}|$ of the acceleration is held in the n-th buffer register $D_n$. By these steps 103–105, the CPU 51 stores the absolute values $|\dot{v}|$ of acceleration detected at regular intervals of T in the N buffer registers $D_0$–$D_{N-1}$ successively. Each time all the registers are stored with values, the CPU returns to the first register and updates successively the contents of this and subsequent registers. As a result, N absolute values $|\dot{v}|$ of the acceleration which were obtained during the latest period of $T \times N$ are stored in the register $D_0$–$D_{N-1}$.

The CPU 51 then successively reads out the contents of all the buffer registers $D_0$–$D_{N-1}$ and calculates the driver's condition index $J_1$, using the formula (2) (step 106). The CPU 51 then ascertains whether the index $J_1$ is in excess of 1 (step 107). If this relation does not hold, then control directly proceeds to the next arithmetic operation II for calculating the road condition index $J_2$. If this relation holds, then the index $J_1$ is reset to 1 (step 108), followed by the execution of the operation II.

(II) Arithmetic Operation for Calculating the Road Condition Index $J_2$

Referring next to FIG. 9, the CPU 51 reads the angle $\theta$ from the register holding the present value (step 111), and then it stores the absolute value $|\theta|$ of the angle in the n-th buffer register $E_n$ (step 112). Whenever the CPU 51 reads the angle $\theta$ from the register holding the present value, it successively changes the addresses of the registers $E_0$–$E_{N-1}$ so that the N newest absolute values of the angle may be stored in the registers $E_0$–$E_{N-1}$. Subsequently, the CPU 51 resets the total count F obtained by a frequency counter at 0 (step 113). Thereafter, the CPU initializes the total count H obtained by a head-fetching counter at the number N of the buffer registers (step 114).

The CPU 51 compares the value held in the H-th buffer register $E_H$ with two preset values B and C which are the upper limit and the lower limit, respectively, of the absolute value of intermediate values of the angle $\theta$ corresponding to mild curves, as shown in FIGS. 6(A) and 6(B) (step 115). If the relation $B \leq E_H \leq C$ holds, the CPU 51 adds 1 to the total count F obtained by the frequency counter (step 116), and then control proceeds to step 117. If this relation does not hold, then control goes to step 117, where 1 is subtracted from the total count H obtained by the head-fetching counter. The CPU 51 compares the total count H with 0 and the execution of the steps 115–117 is repeated until the total count H becomes equal to or less than 0. The total count F obtained by the frequency counter is set to such a value that the relationship $B \leq E_n \leq C$ is satisfied. If the requirement $H \leq 0$ is met, then control proceeds to step 119.

The CPU 51 calculates the road condition index $J_2$, using the formula (3) (step 119). Then, the CPU 51 makes a decision to see whether the index $J_2$ is in excess of 1 or not (step 120). If this condition is not satisfied, control directly proceeds to processing III. If the condition is met, the index $J_1$ is reset to 1 (step 121), followed by the execution of the processing III.

(III) Arithmetic Operation for Calculating the Control Current I and Energization Referring to FIG. 10, the CPU 51 searches the first graph $A_1$ stored in the ROM 52 for the first control current value $i_1$ according to the present vehicle velocity v and the angle $\theta$ which were read into the CPU in steps 101 and 111 (step 131). The CPU similarly searches the second graph $A_2$ for the second control current value $i_2$ according to the velocity v and the angle $\theta$ (step 132). The CPU 51 substitutes the first current value $i_1$, the second current value $i_2$, and the driver's condition index $J_1$ that was calculated by the aforementioned operation I into the following formula to calculate the first intermediate current value $I_1$ by interpolation:

$$I_1 = (i_2 - i_1) \times J_1 + i_1$$

This current value $I_1$ is appropriate as the current applied to the solenoid value 30, corresponding to the present vehicle speed, the angle $\theta$, and the driver's condition when the automobile goes down streets having a few curves.

The CPU 51 searches the third graph $A_3$ for the third control current value $i_3$ according to the present speed v and the angle $\theta$ (step 134). Then, the CPU searches the fourth graph $A_4$ for the fourth control current value $i_4$ according to the present speed v and the angle $\theta$ (step 135). The CPU substitutes the values $i_3$, $i_4$, and the driver's condition index $J_1$ into the following formula to calculate the second intermediate current value $I_2$ by interpolation (step 136):

$$I_2 = (i_4 - i_3) \times J_1 + i_3$$

This second intermediate current value $I_2$ is suitable as a current value applied to the solenoid valve 30, according to the present vehicle speed, the angle, and the driver's conditions when the vehicle goes down a mountain road having many curves.

The CPU 51 substitutes the intermediate current values $I_1$, $I_2$, and the road condition index $J_2$ that was calculated by the operation II into the formula (4) to calculate the output current value I (step 137). This value I is appropriate as a control current value applied to the solenoid value 30 according to the present speed, the angle, the driver's condition, and the road condition. The CPU supplies a control current having this value I to the solenoid 36 of the solenoid valve 30 to energize it (step 138), thus completing the execution of the program illustrated by the flowchart shown in FIGS. 8-10.

Subsequently, the CPU 51 repeatedly runs the program in synchronism with the interrupt signal which is produced at regular close intervals of T to appropriately control the opening of the valve 30 according to the vehicle speed, the angle, the driver's condition, and the road condition. The manual steering torque that is best suited to the angle through which the steering wheel is rotated is determined. Thus, the assisting force produced by the power-steering system decreases as the driver's condition index $J_1$ and the road condition index $J_2$ increase. As indicated by the broken line in FIG. 3(A), the manual steering torque increases with increasing the speed v. As indicated by the broken line in FIG. 3(B), the manual steering torque increases with increasing the angle $\theta$. The manual torque increases as the indices $J_1$ and $J_2$ increase.

The steps 107, 108, 120, and 121 are carried out to prevent the indices $J_1$ and $J_2$ from becoming too large when the driver drives quite boldly and the vehicle goes down a mountain road having quite many curves; otherwise an excessively large manual steering torque would be required.

In the above example, the control current values $i_1$-$i_4$ are taken from the graphs $A_1$-$A_4$ shown in FIGS. 4(A)-4(D), depending on the vehicle velocity v and the angle $\theta$. It is also possible to take the values $i_1$-$i_4$ only according to the velocity v. In this case, the graphs shown in FIGS. 4(A)-4(D) should contain control current values which are set only depending on various values of the velocity, i.e., the current value curves would have a zero slope.

Figure 11:
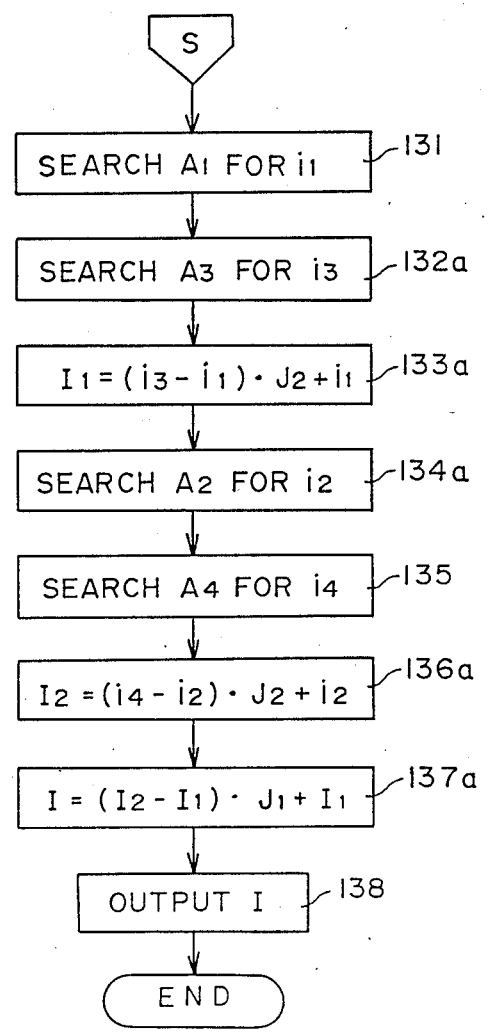
FIG. 11 is a flowchart for illustrating a modification of the flowchart shown in FIG. 10.

FIG. 11 is a flowchart for illustrating a sequence of operations performed instead of the operations illustrated in FIG. 10. In this case, the CPU searches graph $A_1$ shown in FIG. 4(A) for the control current value $i_1$ (step 131). Then, the CPU searches the graph $A_3$ shown in FIG. 4(C) for the control current value $i_3$ (step 132a). The CPU calculates the first intermediate current value $I_1$ from the values $i_1$, $i_3$, and the road condition index $J_2$ (step 133a). The CPU searches the graph $A_2$ shown in FIG. 4(B) for the control current value $i_2$ (step 134a). The CPU searches the graph $A_4$ shown in FIG. 4(D) for the control current value $i_4$ (step 135). Then, the CPU calculates the second intermediate current value $I_2$ from the values $i_2$, $i_4$, and the index $J_2$ (step 136a). Subsequently, the CPU calculates the output control current I from the first intermediate current value $I_1$, the second intermediate current value $I_2$, and the driver's condition index $J_1$ (step 137a). Then, a control current having this value is produced (step 138).

Figure 14:
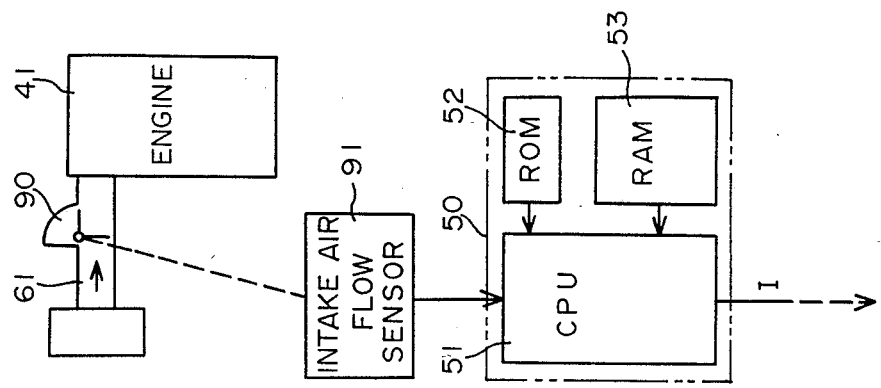
FIGS. 12-14 are block diagrams of modifications of a vehicle speed-detecting means used instead of vehicle speed sensor 40 shown in FIG. 1.
Figure 13:
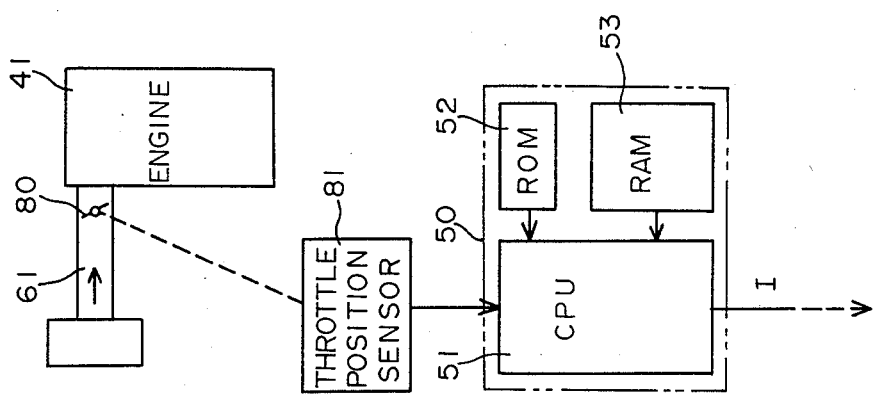
Figure 12:
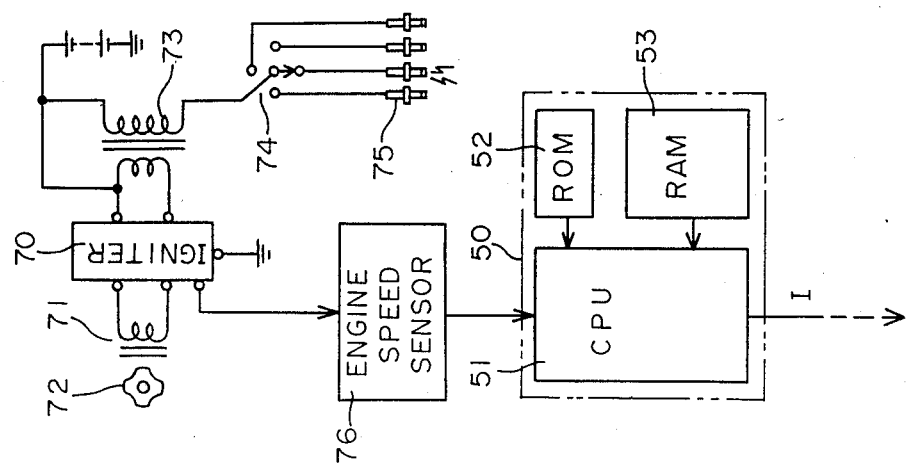

Instead of a signal indicating the vehicle speed as used in the above example, the output signal from an engine speed sensor 76 shown in FIG. 12, the output signal from a throttle valve position sensor 81 shown in FIG. 13, or the output signal from an intake air flow sensor 91 shown in FIG. 14 may be used. The output signals from these sensors 76, 81, 91 vary with changes in the vehicle speed v.

Referring particularly to FIG. 12, the engine speed sensor 76 receives the output signal from an igniter 70 which is driven by a signaling rotor 72 via a pickup coil 11 to selectively ignite a number of spark plugs 75 via an ignition coil 73 and a distributor 74. The rotor 72 is mounted on a camshaft.

Referring next to FIG. 13, the throttle valve position sensor 81 is mechanically coupled to a throttle valve 80 mounted in a fuel gas passage 61 to detect the opening of the valve 80. This valve controls the flow of the fuel supplied to the engine 47.

Referring to FIG. 14, the intake air flow sensor 91 is mechanically coupled to an airflow meter 90 mounted in an intake air passage 61 formed in an electronic fuel injection system.

Also, in the above example, the four control current values $i_1$-$i_4$ are taken from the graphs $A_1$-$A_4$ stored in the ROM 52. It should be understood, however, that the present invention is not limited to an apparatus using such graphs $A_1$-$A_4$. For example, one or more calculational formulae, preferably four formulae corresponding to the graphs $A_1$-$A_4$, may be stored in the ROM 52.

The four control current values $i_1$–$i_4$ may be calculated either from a signal indicating the present vehicle speed or from signals indicating the present speed and the angle through which the steering wheel is rotated, based on the calculational formulae.

Obviously, numerous modifications and variations of the present invention are possible in light of the above teachings. It is therefore to be understood that within the scope of the appended claims, the present invention may be practiced otherwise than as specifically described herein.

What is claimed is:

1. An apparatus for controlling the steering force produced by a power-steering system installed in an automobile and equipped with a solenoid valve which can vary the ratio of the assisting steering torque produced by the power-steering system to the torque applied to the steering wheel by the driver according to a control current applied to the solenoid valve, said apparatus comprising:

a velocity sensor for detecting vehicle velocity information;

an angle sensor for detecting the angle through which the steering wheel is rotated;

a first arithmetic means which receives plural signals from the velocity sensor at predetermined times and calculates a driver's condition index indicating the condition of the driver from these signals;

a second arithmetic means which receives plural signals indicative of the angle from the angle sensor at predetermined times and calculates a road condition index indicating the condition of the road from these signals;

a storage means in which at least four control current characteristic curves are stored, the characteristic curves specifying various control current values according to various values of the velocity of the automobile for each of at least four conditions that consist of the combinations of first and second conditions of the driver and first and second conditions of the road;

a control current value-taking means for taking one control current value corresponding to the output signal from the velocity sensor from each of the at least four control current characteristic curves;

a third arithmetic means for calculating an output control current value from the at least four control current values taken by the control current value-taking means, from the driver's index calculated by the first arithmetic means, and from the road condition index calculated by the second arithmetic means; and a valve-actuating means for applying to the solenoid valve an electric current corresponding to the output control current value calculated by the third arithmetic means.

2. An apparatus as set forth in claim 1, wherein said storage means stores a first graph that defines various control current values corresponding to various values of the velocity of the automobile when the automobile goes down streets or roads having a few curves and the driver drives moderately, a second graph that defines various control current values corresponding to various values of the velocity of the automobile when the automobile goes down streets or roads having a few curves and the driver drives boldly, a third graph that defines various control current values corresponding to various values of the velocity of the automobile when the automobile goes down mountain roads or other roads having frequent curves and the driver drives moderately, and a fourth graph that defines various control current values corresponding to various values of the velocity of the automobile when the automobile goes down mountain, roads or other roads having frequent curves and the driver drives boldly.

3. An apparatus as set forth in claim 2, wherein said third arithmetic means comprises:

a first current-calculating means for calculating a first intermediate current value from the driver's condition index calculated by the first arithmetic means and from the two control current values taken from the first and second graphs;

a second intermediate current-calculating means for calculating a second intermediate current value from the driver's condition index calculated by the first arithmetic means and from the two control current values taken from the third and fourth graphs; and an output current-calculating means for calculating the output current value from the road condition index calculated by the second arithmetic means and from the first and second intermediate current values.

4. An apparatus as set forth in claim 2, wherein said third arithmetic means comprises:

a first current-calculating means for calculating a first intermediate current value from the road condition index calculated by the second arithmetic means and from the two control current values taken from the first and third graphs;

a second current-calculating means for calculating a second intermediate current value from the road condition index calculated by the second arithmetic means and from the two control current values taken from the second and fourth graphs; and an output current-calculating means for calculating the output current value from the driver's condition index calculated by the first arithmetic means and from the first and second intermediate current values.

5. An apparatus as set forth in claim 2, wherein each of the first, second, third, and fourth graphs stored in the storage means contains said various control current values, corresponding to various values of the steering angle as well as to various angles of the velocity of the automobile, and wherein said control current value-taking means takes one control current value from each of the first through fourth graphs according to both the signal indicating the velocity of the automobile and the signal indicating the angle.

6. An apparatus as set forth in claim 2, wherein said first arithmetic means comprises:

a reading means for reading the information delivered from the velocity sensor at predetermined intervals of time;

an acceleration-calculating means for differentiating the information read by the reading means to find the acceleration;

an absolute value-calculating means for taking the absolute value of the acceleration found by the acceleration-calculating means;

an updated storage means for storing the newest predetermined number of the absolute values of the accelerations successively found by the absolute value-calculating means; and an index-calculating means for integrating the absolute values of the accelerations stored in the updated storage means to find the driver's condition index.

7. An apparatus as set forth in claim 6, wherein said second arithmetic means comprises:
 a reading means for reading the output signal from the angle sensor at predetermined intervals of time;
 an absolute value-calculating means for taking the absolute value of the output signal from the reading means;
 an updated storage means for storing the newest predetermined number of the absolute values found by the absolute-calculating means;
 a counter means for finding the number of those absolute values which are stored in the updated storage means and which lie within a given range; and
 an index-calculating means for calculating the road condition index from the number found by the counter means and from the number of absolute values stored in the updated storage means.

* * * * *